United States Patent
Scott et al.

(10) Patent No.: US 9,241,478 B2
(45) Date of Patent: Jan. 26, 2016

(54) ADJUSTABLE DOSAGE MICROPARTICULATE FEEDER FOR LARVAL AND JUVENILE FISHES

(71) Applicant: The United States of America, represented by the Secretary of Commerce, Washington, DC (US)

(72) Inventors: Thomas M Scott, Seattle, WA (US); Kenneth Ashley Webb, Jr., Port Orchard, WA (US)

( * ) Notice: Subject to any disclaimer, the term of this patent is extended or adjusted under 35 U.S.C. 154(b) by 0 days.

(21) Appl. No.: 14/797,085

(22) Filed: Jul. 11, 2015

(65) Prior Publication Data

US 2015/0313189 A1 Nov. 5, 2015

Related U.S. Application Data

(63) Continuation-in-part of application No. 14/212,301, filed on Mar. 14, 2014, now Pat. No. 9,113,615.

(51) Int. Cl.
*A01K 61/02* (2006.01)
*A01K 5/02* (2006.01)

(52) U.S. Cl.
CPC . *A01K 61/02* (2013.01); *A01K 5/02* (2013.01); *A01K 5/0291* (2013.01); *A01K 61/025* (2013.01)

(58) Field of Classification Search
CPC ..... A01K 5/0291; A01K 61/025; A01K 5/02; A01K 5/0216; A01K 5/0275; A01K 61/02
USPC .............. 119/51.04, 51.01, 56.1, 57.1, 57.91, 119/57.92, 51.11
See application file for complete search history.

(56) References Cited

U.S. PATENT DOCUMENTS

| | | | |
|---|---|---|---|
| 2,785,831 A | 5/1953 | Smolin | |
| 3,050,029 A | 8/1962 | Appleton | |
| 3,231,314 A | 1/1966 | Cook | |
| 3,717,125 A | 2/1973 | Sanders | |
| 3,738,328 A | 6/1973 | Hoday et al. | |
| 3,920,224 A * | 11/1975 | Fassauer | A01K 5/0291 119/51.11 |
| 4,089,299 A | 5/1978 | Suchowski | |
| 4,399,588 A | 8/1983 | Molinar | |
| 4,422,409 A * | 12/1983 | Walker | A01K 5/0291 119/51.11 |
| 4,429,660 A | 2/1984 | Olsen et al. | |
| 4,604,970 A * | 8/1986 | Blicher | A01K 5/02 119/51.5 |
| 4,628,864 A | 12/1986 | Smelzer | |
| 4,665,862 A * | 5/1987 | Pitchford, Jr. | A01K 5/0291 119/51.11 |
| 4,972,802 A * | 11/1990 | Huddleston | A01K 61/02 119/51.04 |
| 5,072,695 A | 12/1991 | Newton et al. | |

(Continued)

OTHER PUBLICATIONS

Ziegler Belt Feeders brochure (Zeigler Bros., Inc., Gardners, Pennsylvania) Sep. 4, 2009.
Intellifeed Aquarium Fish Feeder operating instructions, (Lifegard Aquatics, Cerritos, California), undated. Downloaded and Printed on Feb. 12, 2014.
EHEIM 3582 Automatic Feeder User Manual (EHEIM GmbH & Co. KG of Deizisau, Germany), Jan. 2008.
Fish Mate F14 Instructions (Ani Mate Inc., Conroe, Texas) undated, Downloaded and Printed on Feb. 12, 2014.
Sweeney Aquaculture Feeders brochure (Sweeney Feeders, Boerne Texas), undated, Downloaded and Printed on Feb. 12, 2014.
Minature HI-ROTOR/Standard type PRN series product specification sheets, (Parker-Kuroda, Chiba, Japan) undated. Downloaded and Printed Feb. 12, 2014.

(Continued)

*Primary Examiner* — Yvonne Abbott-Lewis

(57) ABSTRACT

A feeder for larval and juvenile fishes is capable of delivering an adjustable dose of microparticulate feed to selected locations, via pneumatic conveyance and control. A source of low-pressure dry gas is used to blow microparticulate feed through a manifold and into a selected one of a number of tubes. In order to adjust the portion dispensed by the feeder, an adjustable portion control is provided. Instead of a fixed sized ration cup a threaded recess is provided. Within the recess is provided a mating nylon set screw with an Allen hex head socket. By screwing the set screw in, or out, a user may increase, or decrease the volume of each dose.

22 Claims, 6 Drawing Sheets

(56) References Cited

U.S. PATENT DOCUMENTS

| | | | | |
|---|---|---|---|---|
| 5,150,666 | A * | 9/1992 | Momont | A01K 61/02 119/51.04 |
| 5,199,381 | A | 4/1993 | Masopust | |
| 5,353,745 | A | 10/1994 | Fahs, II | |
| 5,709,166 | A | 1/1998 | Evans et al. | |
| 5,795,108 | A * | 8/1998 | Lightle | B65G 53/12 406/123 |
| 5,799,608 | A * | 9/1998 | Beck | A01K 61/025 119/51.04 |
| 5,873,326 | A * | 2/1999 | Davet | A01K 61/025 119/245 |
| 6,012,875 | A * | 1/2000 | Goettelmann | B65G 53/14 406/144 |
| 6,082,299 | A | 7/2000 | Halford | |
| 6,192,830 | B1 | 2/2001 | Lin | |
| 6,571,736 | B2 | 6/2003 | Patterson | |
| 6,715,442 | B1 | 4/2004 | Belloma | |
| 6,938,652 | B1 * | 9/2005 | Harmon, Jr. | A01K 61/025 119/51.04 |
| 7,021,469 | B2 * | 4/2006 | Romagnoli | B65B 37/005 209/212 |
| 8,689,738 | B2 * | 4/2014 | Steffen | A01G 33/00 119/212 |

OTHER PUBLICATIONS

RedValve™ Series 2600 product brochure, Red Valve Company, Inc. of Carnegie, Pennsylvania http://www.redvalve.com/rv/index.php/content/view/28/92/ (c) 2014, downloaded and printed Feb. 12, 2014.

Michael B. Rust, "The Challenges of Feeding Microparticulate Diets to Larval Fish", The Advocate, Feb. 2000, pp. 19-20.

Juan P. Lazo, et al, "Co-feeding microparticulate diets with algae: toward eliminating the need for zooplankton at first feeding in larval red drum", Aquaculture, 188, (2000) pp. 339-351.

Arvotec, Feeding Technology for Modern Aquaculture, Huutokosken Arovkala Group, Huutokoski, Finland, undated, downloaded and printed Feb. 12, 2014.

ArvoTecvrotech Feeder and Spreader Manual, Arvo-Tec, Huutokoski, Finland, Jan. 8, 2007.

ArvoTech Feeding Technology, Arvo-Tec, Huutokoski, Finland, downloaded and printed Feb. 12, 2014.

Industrial Specialties, Item No. CVT-18VL, Feb. 25, 2014.

* cited by examiner

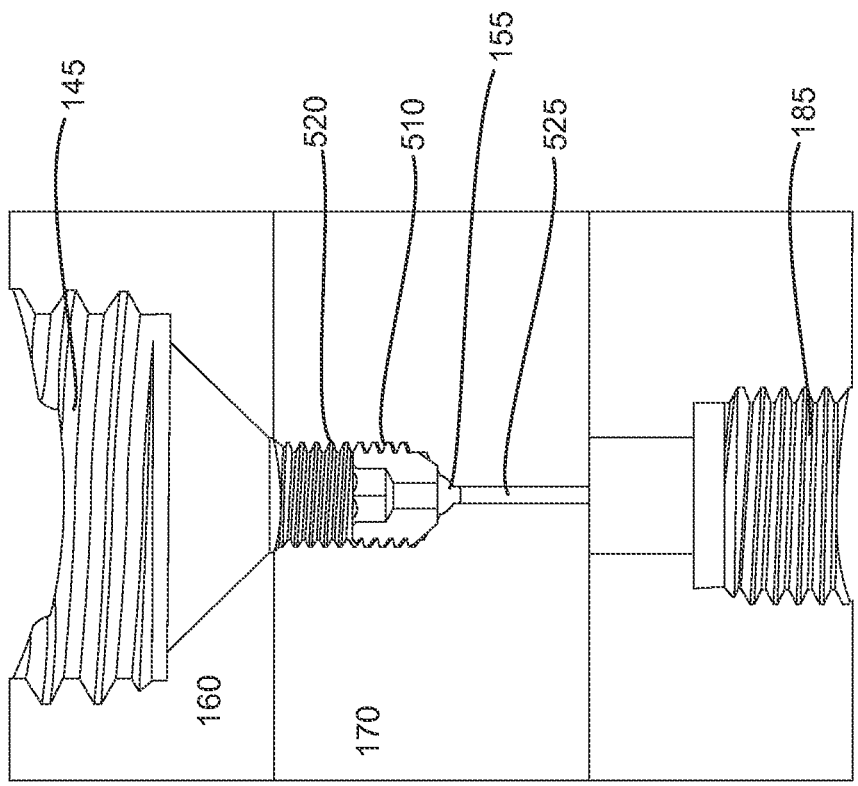
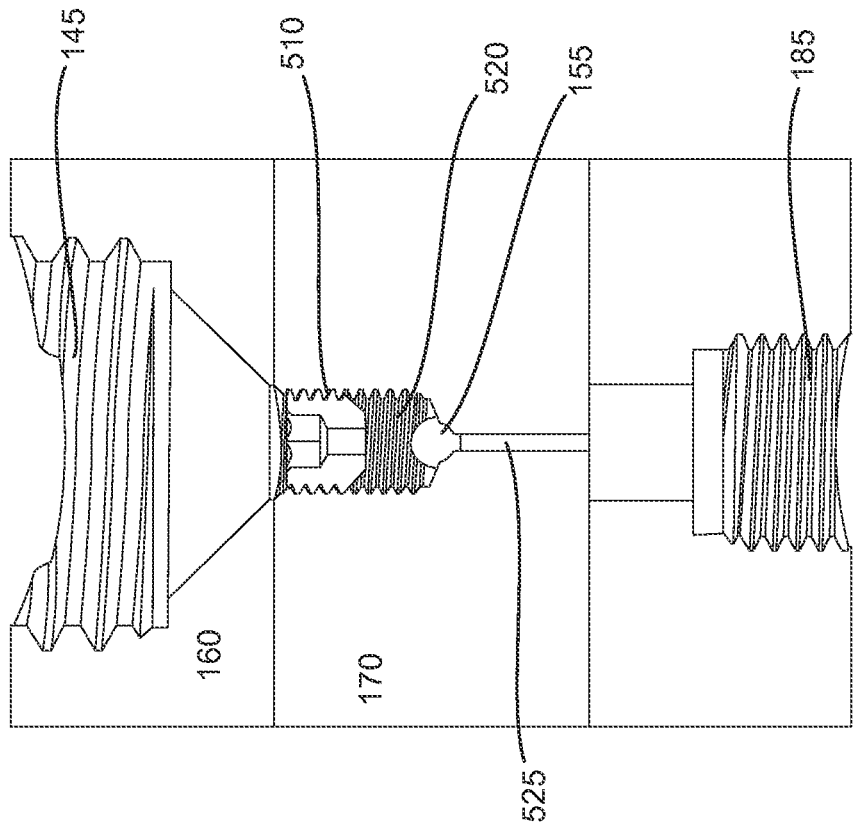

ADJUSTABLE DOSAGE MICROPARTICULATE FEEDER FOR LARVAL AND JUVENILE FISHES

CROSS-REFERENCE TO RELATED APPLICATIONS

The present application is a Continuation-In-Part of U.S. patent application Ser. No. 14/212,301 filed on Mar. 14, 2014, and incorporated herein by reference.

STATEMENT OF GOVERNMENT INTEREST

The research that led to the development of the present invention was sponsored by the National Oceanic and Atmospheric Administration's (NOAA's) National Marine Fisheries Service (NMFS). NOAA is a part of the U.S. Department of Commerce, a component of the U.S. Federal government. The United States Government has certain rights in this invention.

FIELD OF THE INVENTION

The present invention relates to fish feeder. In particular, the present invention is directed toward a microparticulate feeder for larval and juvenile fishes.

BACKGROUND OF THE INVENTION

Microparticulate diets for larval and small juvenile fish pose specific challenges for aquaculturists. Microparticulate diets, by definition, have a very high specific surface area, making them vulnerable to the effects of oxidation and hydration. Many of the diet components are often labile and hygroscopic, which further exacerbates the problem. Fine, hygroscopic particles tend to clump and cake together, and adhere to surfaces with which they come in contact, making rationing and delivery difficult to achieve by automation. See, e.g., Michael B. Rust, "The Challenges of Feeding Microparticulate Diets to Larval Fish", The Advocate, February 2000, pages 19-20, and Juan P. Law, et al, "Co-feeding microparticulate diets with algae: toward eliminating the need for zooplankton at first feeding in larval red drum", Aquaculture, 188, (2000) pages 339-351, both of which are incorporated herein by reference.

The digestive system of larval fish is slow to develop; so artificial diets fed to them must have a high leaching rate in order to make nutrients available to the larvae that ingest the diets. This high leaching rate is a two-edged sword, in that upon contact with the water, nutrients are often lost to solution before the larvae can ingest them. Larval fish also have no body energy reserves to call upon and so they require a constant stream of available nutritive feed. To circumvent this problem, culturists often employ a technique called, "feeding the water", where feed is delivered in pulses to excess. The feed is either eaten, falls to the bottom of the tank, or is cleared by the exchange of circulating water in the tank. This technique unfortunately creates an alternating feast and famine situation that is conducive to neither good nutrition nor good hygiene.

Small juvenile fish have a digestive system and some reserves, however they still require frequent feeding, and accurate rations. Feeding early juvenile fish can be prohibitively expensive in terms of husbandry labor. Most of this labor is rationing and feeding. Accuracy of ration is paramount in diet trials, where growth and feed conversion are correlated to the diet actually consumed by the fish; therefore feeding the water will not work. An accurate ration is calculated based upon what the fish can be expected to eat in one feeding, and must be precisely delivered for a diet trial experiment to succeed.

Prior Art automated fish feeders can be categorized by a few basic groups:

Belt feeders, generally employ a slow moving, spring wound clock powered, conveyor belt that dumps the feed off the belt as it is rolled up over the tank. An example of such a feeder is the Ziegler Belt Feeder, manufactured by Zeigler Bros., Inc. of Gardners, Pa. See, e.g., *Ziegler Belt Feeders* brochure (Zeigler Bros., Inc., Gardners, Pa.) Sep. 4, 2009, incorporated herein by reference Drum feeders employ a rotating drum filled with feed and capture a small aliquot for feeding and dispenses it with each rotation. An electric clock motor usually powers this type of feeder. An example of such a feeder is the Lifegard Aquatics Intellifeed Aquarium Fish Feeder, made by Lifegard Aquatics of Cerritos, Calif. See, e.g., Intellifeed Aquarium Fish Feeder operating instructions, (Lifegard Aquatics, Cerritos, Calif.), incorporated herein by reference.

Shear feeders use some method of sliding the feed off of a base and over an edge to drop into the fish tank. This type of feeder also includes screw feeders and dial feeders, which have individual rations in separate chambers, arranged radially on a disk. The disk rotates, powered by a synchronous AC clock motor and the feed drops as it is slid over a hole in the base. An example of a screw-type feeder is the Eheim 3582 Automatic Feeder by EHEIM GmbH & Co. KG of Deizisau, Germany. An example of a dial-type feeder is the Fish Mate F14 by Ani Mate Inc., of Conroe, Tex. See, e.g., *EHEIM 3582 Automatic Feeder* User Manual (EHEIM GmbH & Co. KG of Deizisau, Germany), January 2008 and *Fish Mate F14 Instructions* (Ani Mate Inc., Conroe, Tex.), both of which are incorporated herein by reference.

Vibrating feeders use a hopper with a narrow annular opening, allowing the feed to drop when the unit is vibrated. An example of a vibratory feeder is the Sweeney Model AF6 Vibratory Feeder by Sweeney Feeders of Boerne Tex. See, e.g., *Sweeney Aquaculture Feeders* brochure (Sweeney Feeders, Boerne Tex.), incorporated herein by reference.

There are a number of Prior Art Patents relating to various fish feeders. The following is a summary of a number of those Prior Art Patents.

Belloma, U.S. Pat. No. 6,715,442, issued Apr. 6, 2004, and incorporated herein by reference, discloses a fish feeder having inner and outer trays, which move relative to one another, to dispense fish feed using gravity. Belloma discloses using a pneumatic actuator to power the device.

Patterson, et al., U.S. Pat. No. 6,571,736, issued Jun. 3, 2003, and incorporated herein by reference, discloses a fish feeder for use with moist fish feed. The moist feed disclosed are pellets, of the type used with fish farming. A blower is used to direct the fish pellets towards a fish pen through a nozzle attached to the device.

Lin, U.S. Pat. No. 6,192,830, issued Feb. 27, 2001, and incorporated herein by reference, discloses an underwater fish feeder than uses compressed air. Compressed air is used to eject fish feed from a remote fish feed holder.

Halford, U.S. Pat. No. 6,082,299, issued Jun. 4, 2000, and incorporated herein by reference, discloses an automatic fish feeder using a screw-type mechanism to eject fish feed from a hopper, which then falls into the fish tank.

Evans et al., U.S. Pat. No. 5,709,166, issued Jan. 20, 1998, and incorporated herein by reference, discloses a refrigerated automatic fish feeder.

Flahs, I I, U.S. Pat. No. 5,353,745, issued Oct. 11, 1994, and incorporated herein by reference, discloses an Aquaculture system and methods for using same. A feeding hopper (FIG. 5) is used to gravity feed the diet to the tank. A gas ejector 110 is used to spread the feed over the surface.

Masopust, U.S. Pat. No. 5,199,381, issued Apr. 6, 1993, and incorporated herein by reference, discloses an automatic fish feeder using a rotating disc.

Newton et al., U.S. Pat. No. 5,072,695, issued Dec. 17, 1991, and incorporated herein by reference, discloses an automatic fish feeder using a rotating wheel.

Smelzer, U.S. Pat. No. 4,628,864, issued Dec. 16, 1986, and incorporated herein by reference, discloses an automatic fish feeder, which is water-driven. A water-filled container drives a rotating arm.

Olsen et al., U.S. Pat. No. 4,429,660, issued Feb. 7, 1984, and incorporated herein by reference, discloses a Water Powered Fish Feeder. As with Smelzer, water drives a lever arm to dispense fish feed.

Molinar, U.S. Pat. No. 4,399,588, issued Aug. 23, 1983, and incorporated herein by reference, discloses an automatic fish feeder and orienter. This device actually orients individual fishes for feeding.

Suchowski, U.S. Pat. No. 4,089,299, issued May 16, 1978, and incorporated herein by reference, discloses an air-operated fish feeder. This device, which is immersed in a fish tank, is operated by air pressure, apparently from an aquarium pump.

Hoday et al., U.S. Pat. No. 3,738,328, issued Jun. 12, 1973, and incorporated herein by reference, discloses a Fish Feeder for an aquarium, which is driven by a clock motor.

Sanders, U.S. Pat. No. 3,717,125, issued Feb. 20, 1973, and incorporated herein by reference, discloses an automatic feeder for a fish aquarium. A piston slides a rod, which takes feed from a hopper and passes it to the aquarium once a day.

Cook, U.S. Pat. No. 3,231,314, issued Jan. 25, 1966, and incorporated herein by reference, discloses an automatic fish feeder using a blower motor for dispensing palletized fish feed to a fish tank. A hopper dispenses fish feed to two fish tanks (FIG. 5) via two parallel discharge ducts 4 (Col. 3, lines 12-41). A reciprocating metering plate dispenses fish feed from the hopper. A blower is used to force the feed to two tanks at the same time, and to dry the ducts.

Appleton, U.S. Pat. No. 3,050,029, issued Aug. 21, 1962, and incorporated herein by reference, discloses an automatic fish feeder of the disc variety.

Smolin, U.S. Pat. No. 2,785,831, issued May 28, 1953, and incorporated herein by reference, discloses an automatic fish feeder with a rotating shaft, which dispenses a measured amount from a hopper, via gravity feed.

The Arvotec T Drum 2000 Feeder (see. e.g., *Arvotec, Feeding Technology for Modern Aquaculture* brochure Huutokosken Arovkala Group, Huutokoski, Finland, and *Arvotec Feeder and Spreader Manual*, Arvotec, Huutokoski, Finland, and *Arvotec, Feeding Technology* brochure, Huutokosken Arovkala Group, Huutokoski, Finland, all of which are incorporated herein by reference) discloses a hopper-type feeder with a compressed air dispersal unit. Compressed air is used to blow the feed from a chute, onto the surface of a fish tank. Note the dosing drum designs (Page 9, of the Feeding Technology Manual) and the nature of the compressed air dispersal unit (Page 9 of the Feeder and Spreader manual).

The Arvotec Feeding Technology manual also discloses the use of a centralized pipe feeding system, with a manifold and a number of pipes to feed different tanks. Each manifold may feed up to four tanks, and up to 28 tanks may be fed. It appears each manifold has a switching device to direct feed to a different tank, via a 3" open-ended pipe. However, as with the Cook reference, this embodiment uses a blower to blow feed through large (3") open pipes. The problem with such a design, as with Cook, the open-ended pipes above fish tanks, may harbor moisture, making such a design unsuitable, particularly for microparticulate feeds, which may cake and clog in the piping. The brochure states that the number of pipes is reduced, which makes cleaning easier. However, this seems to be an admission that runs of piping with fish feed and moisture contamination could require frequent cleaning. Moist caked-on fish feed in such pipes would be an ideal environment for the growth of bacteria, fungus, and mildew, which could in turn sicken or kill the fish or larva being fed.

To avoid this problem, Arvotec shows another "robotic" embodiment, where one or more hopper-type feeders are mounted on a monorail, which in turn is moved over a plurality of tanks to distribute the feed. The problem with this design is that the hoppers need to be refilled over time. To solve this problem, in another embodiment, long hoses are used to refill the hoppers from even larger hoppers. However, such a design results in a large number of expensive components, hoppers, blowers, hoses, and the like, adding to cost and complexity. Moreover, the hoses need to be made flexible enough to avoid interfering with the operation of the monorail. The robotic solution is rather costly and over-designed.

In another embodiment, the Arvotec Feeder shows a rotating drum feeder, where the drum rotates to measure a portion of feed (determined by cutout sizes in the drum) and when rotating, dumps these onto a dispersal plate. Compressed air is used to spray the feed over the surface of the water. In one embodiment, which is illustrated on a YouTube video, compressed air is used to disperse the fish feed pellets. From the video, as well as the product catalogs, it appears that the feeder merely dumps feed onto a plate, which in turn uses a timed charge of compressed air to spray onto the surface of a fish tank. In another embodiment, a rotary (spinner-type) spreader is used. The feeder in that embodiment is mounted above the tank, and thus does not solve the problem of moisture contaminating the fish feed.

The most common shortcoming of all these prior feeders is that they don't protect the feed from the effects of moisture and oxygen. Since most feeders dispense the feed directly above the fish tank, they subject the feed to a highly humid environment. The hygroscopic nature of larvae feeds results in feed eventually caking and accumulating on the feeder surfaces, resulting in deterioration of both the feed quality, and the accuracy and precision of the dispensed ration.

The challenge then, is to create a feeder that can repeatedly and automatically deliver a small, precise amount of a fragile and functionally difficult material, and protect the feed from the environment when not in use. It remains a requirement in the art to provide a feeder which may be used to feed multiple tanks, without the need for large tubes, as well as avoiding moisture and caking in such tubes, which would as a result, require frequent cleaning. And it remains a requirement in the art to provide such a feeder in a simple and straightforward manner that minimizes the number of components, cost, and complexity of the device.

SUMMARY OF THE INVENTION

The present invention improves upon the Prior Art by overcoming the environmental challenges that lead to inconstant rationing and reduced feed quality associated with other feeders. By separating the dosing dispenser from the terminal delivery, the feed can be protected from the humid environment above the fish tank. A sealed rotating chamber further protects the feed in the hopper from moisture and oxygen between feedings. In addition to conveying the feed, the gas dries both the feed and the tubing and terminal valve during feeding. Thus the system avoids accumulation of feed on surfaces exposed to the atmosphere.

The small (ca. 15 mg) precisely sized portion dispensed by the feeder of the present invention affords a greater control of the feeding schedule so that fish can be fed evenly over time or, for growth trials, to a precise ration. In recent tests, the feeder of the present invention was used to compare repeated accumulations of feed from ten cycles of the rotating chamber. The feed was trapped by a mineral oil bath in a tared beaker. After five repetitions, the standard deviation is generally 3% of the mean accumulated weight. In tests of the manifold system, a standard deviation of 5% of the mean was achieved after 200 rations delivered to each of two terminal valves, ten cycles each at 15 min. intervals, over five hours. The test feedings were initially spread out over five hours to relieve the duty cycle of the controlling solenoids, ensuring that they did not overheat. Subsequent testing has shown this to be unnecessary, and tests are now conducted at five-minute intervals.

In order to adjust the portion dispensed by the feeder, in another embodiment, an adjustable portion control is provided. In this embodiment, instead of a fixed sized ration cup (formed by drilling into the rotating component), a ¼"×28 tpi (or other appropriately sized) threaded recess is provided. Within the recess is provided a mating nylon set screw with an Allen hex head socket. The set screw and recess also have a small hole through the bolt to allow the carrier (conveyance) gas to purge the feed hopper at each dosing. By screwing the set screw in, or out, a user may increase, or decrease the volume of each dose. In operation, a user may adjust two or more feeders to compensate for variation in nutrient density between diets. Prior to this innovation, a user may have to rely upon the relatively small size of each dose to the overall daily ration, and make up for differences with increased or decreased number of iterations. This improvement greatly improves the precision of studies utilizing multiple feeders.

BRIEF DESCRIPTION OF THE DRAWINGS

FIG. 7 is side view cross-section of adjustable dosage dispenser of a second embodiment of the present invention in the load position, showing the feeder dosage adjustment screw in a first position, to maximize dosage.

FIG. 8 is side view cross-section of adjustable dosage dispenser of a second embodiment of the present invention in the load position, showing the feeder dosage adjustment screw in a second position, to minimize dosage.

DETAILED DESCRIPTION OF THE INVENTION

Figure 1:
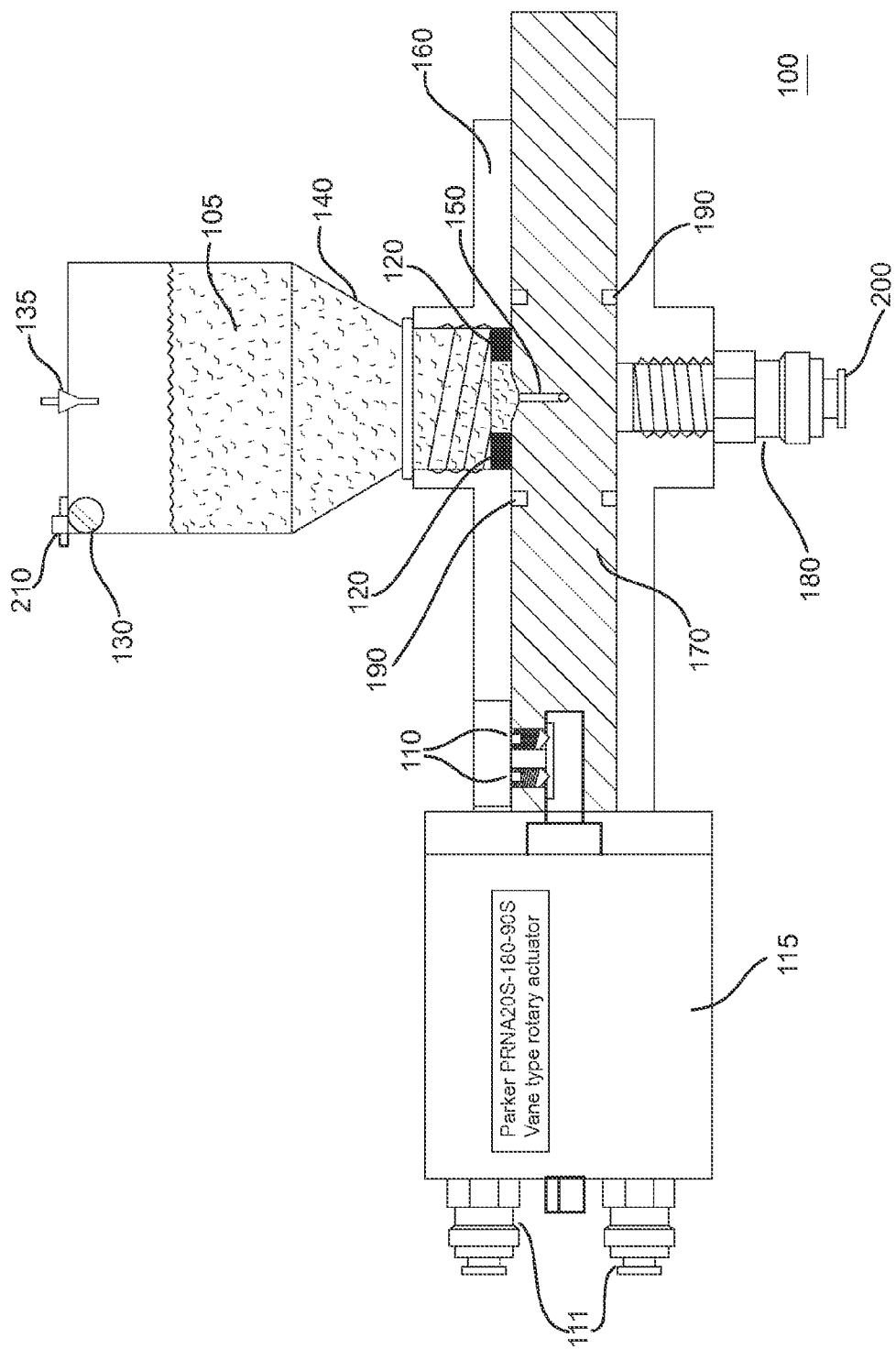
FIG. 1 is an elevation view of dispenser components of microparticulate feeder.

FIG. 1 is an elevation view of dispenser components of microparticulate feeder. Note that the depicted design uses 'O' rings 190 as both seals and bearings. In an alternative embodiment, captive ball bearings and cup seals may be used to ensure long-term performance over a heavy-duty cycle.

Figure 4:
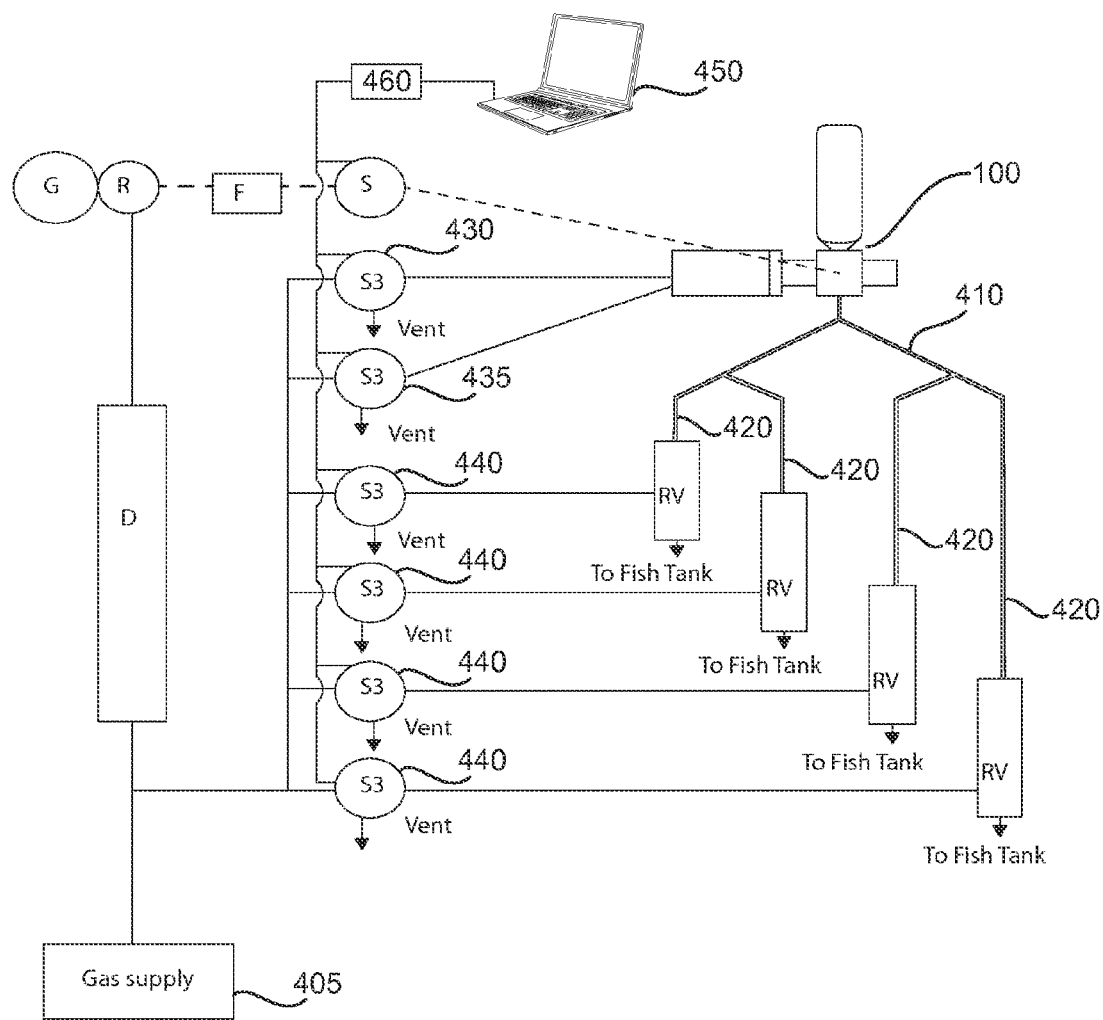
FIG. 4 is a schematic of pneumatic controls and conveyance components of the microparticulate feeder system.

Referring to FIG. 1, the feeder of the present invention uses a manifold delivery system (as shown in FIG. 4) attached to a central dispensing unit 100. Thus, one feeder can feed several fish tanks. The feeder 100 dispenses a discrete volume of feed 105, determined by a chamber 150 in a rotating component 170, rotating within housing 160. The feed 105 is loaded into the chamber 150 by gravity from a sealed hopper 140 above the chamber 150. A small vibrator 130, attached to the hopper 140, aids in settling the feed into the chamber. Vibrator 140 may comprise a cell phone type vibrator commonly known in the cell phone art. The chamber 150 includes an L-shaped airway radially situated through the rotating component 170. Rotating component 170 is supported by O-rings 190, which act as bearings. The chamber is isolated by the O-rings 190, which also act as seals.

Rotating component 170 is rotated back and forth through an 180° arc via a pneumatic actuator 115 such as the Parker PRNA20S-180-90S pneumatic actuator made by Parker-Kuroda of Chiba, Japan. See, e.g., *Miniature HI-ROTOR/ Standard type PRNseries* product specification sheets, (Parker-Kuroda, Chiba, Japan) incorporated herein by reference. Actuator 115 may be coupled to rotating component 170 by setscrews 110. The actuator 115, rotating component 170 and feed hopper 140 may all be supported by a PVC housing 160. In one embodiment, the dispenser housing 160 is machined from one piece of solid PVC. Rotating component 170 may be made of polyacetal resin and be approximately ¾" in diameter to match the inner diameter of housing 160. Epoxy potting 120 may be used to ensure an interference fit against the rotating component 170 at the loading port of the housing 160.

Rotary actuator 115 may be coupled to a pressurized gas source via connectors 111, which may comprise push-to-connect 5/32" tubing fittings. As will be discussed in more detail below in connection with FIG. 4, pressure to rotary actuator may be controlled electronically, via solenoid valves, to time the system to dispense feed to individual feeders, using a pre-programmed controller.

LED 210 may be used to indicate to the user that the vibrator has been activated. Most hatchery environs are too noisy to hear the vibrator being actuated, and LED 210 provides a visual indication in such a noisy environment. In addition, if multiple feeders are used, as in the case of a diet study where multiple diets are being tested against one another, then LEDs of different colors distinguish which feeder is being deployed.

A small one-way vent valve 135 such as the CVT-18VL check valve, made by Industrial Specialties Mfg. & IS Med Specialties of Englewood, Colo. (see. e.g., the Specialties Mfg. & IS Med Specialties CVT-18VL spec sheet, incorporated herein by reference) may be attached near the top of the hopper, next to the LED. Its function is to vent any excess pressure from gas that blows into the hopper. Typically, this occurs when the rotating component 170 is rotated into the load position, thus venting the previously pressurized manifold. The gas passes upwards through the feed, keeping it loose and desiccated.

Figure 2:
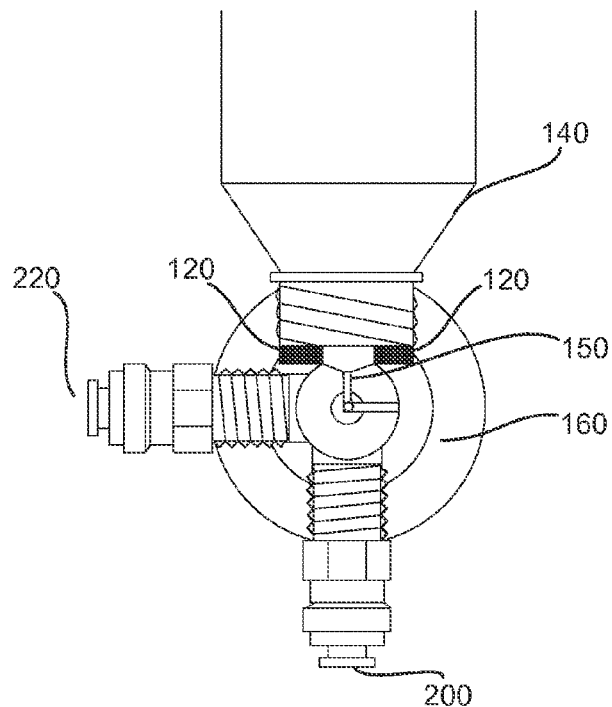
FIG. 2 is cross-section of dispenser component in the load position.
Figure 3:
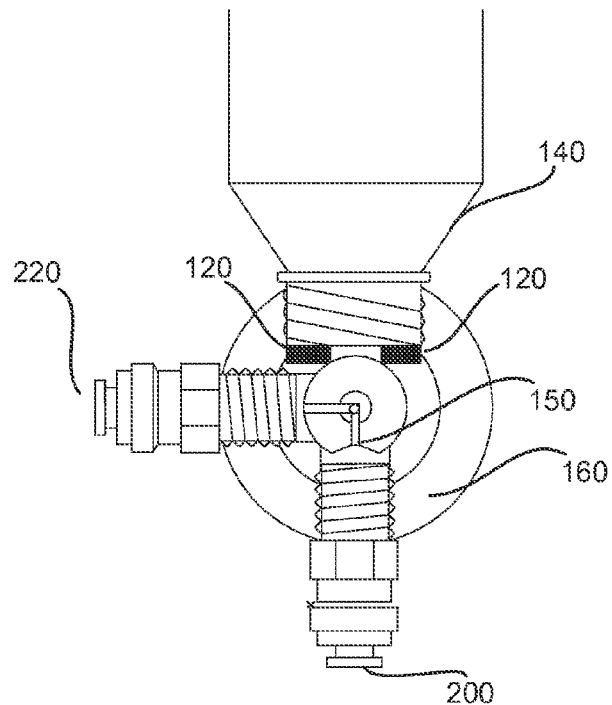
FIG. 3 is cross-section of dispenser component in the discharge position.

FIG. 2 is cross-section of dispenser component in the load position. FIG. 3 is cross-section of dispenser component in the discharge position. Referring to FIG. 2, when in the "load" position, chamber 150 is positioned under the hopper 140, and the L-shaped airway portion is sealed against the housing 160. Feed falls from the hopper, aided by vibrator 130, into the chamber 150. In the "discharge" position, as shown in FIG. 3, the chamber 150 is positioned above the exit port 200, and the L-shaped airway is connected to the carrier gas port 220. Dry compressed air or other gas (e.g., nitrogen or the like) then pushes the portioned feed out through exit port 200.

As illustrated in FIG. 4, the exit port 200 is connected via a distribution manifold 410 and tubing 420 to one or more terminal valves RV, located at one or more fish tanks. Distribution manifold 410 may comprise a plurality of Y-type tubing manifolds, connected in series, in order to provide the desired number of outlets. A number of different manifold designs were tried, and the common tube style was rejected, as feed hangs up in it, and then breaks off to dispense randomly. Thus, the multiple-Y design as shown as element 410 in FIG. 4 is used, and it works quite well with, no hang up.

The terminal valves RV may comprise a pneumatically operated pinch valve such as the RedValve™ 2600, manufactured by Red Valve Company, Inc. of Carnegie, Pa., that seals the tubing 420 when not in use. See, e.g., RedValve™ Series 2600 product brochure, (Red Valve Company, Inc., Carnegie, Pa.), incorporated herein by reference. The actuator 115 and terminal valves 420 are pneumatically controlled via computer driven solenoids S3 (430, 440), while the carrier gas supply is controlled via solenoid valve S, as illustrated in FIG. 4.

In one embodiment, corresponding colored polyethylene tubing may be used for the manifold and dispenser tubing, to make it easier to know which tanks are being fed. Separate manifolds may be required to avoid cross contamination of test diets; in general feeding, this would not be necessary. A second LED in the solenoid activation circuit may also indicate which solenoid is activated, and which corresponding tank is being fed.

FIG. 4 is a schematic of pneumatic controls and tuning components of the microparticulate feeder system of the present invention. A gas supply 405 is fed to a dessicator D, to remove any excess water. Compressed air may be used, utilizing a small portable air compressor, or other supply of compressed air, suitably regulated, from an industrial source. Dessicator D may be used to remove any excess water from the air supply. As noted previously, microparticulate feeds may be sensitive to moisture. Thus, to prevent caking and clogging, a supply of dry gas may be required. As an alternative to compressed air, other gases, such as nitrogen may be used, having the additional advantage of reducing oxidation of feed in the supply tubing 420.

Output of dessicator D is fed to regulator R, which may be provided with gauge G, so that pressure may be adjusted to appropriate levels as previously discussed. Gas pressure used is typically between 3-5 psi static, and 1-2 psi dynamic. Flowmeter F measures flow of gas (generally 5-10 Lpm), for use in dispensing microparticulate feed. Solenoid valve S maybe activated to pass this lower-pressure gas to port 220 of dispenser 100, to force the metered portion of microparticulate feed through manifold 410, though tubing 420, and out of an opened one of a plurality of terminal valves RV. For the purposes of this application, the terms "carrier gas" is used to describe the dried, lower-pressure gas used to force the microparticulate feed though the system. The term "actuator gas" is used herein to describe the higher-pressure gas used to activate terminal valves and the actuator.

The use of dried compressed air (or other gases) represents an improvement over Prior Art devices, which attempt to use blowers and the like to blow feed to multiple fish tanks. Blowers, using atmospheric air, do not provide a means for drying the air, and thus may result in caking and clogging if microparticulate feed is used. For that reason, Prior Art systems using blowers and the like are generally limited to pellitized feed, which is less likely to cake or clog due to moisture.

Gas supply 405 may also be used for actuator gas to control terminal valves RV. As the actuator gas used to control actuator 115 of dispenser 100, as well as terminal valves RV is not in contact with the microparticulate feed, higher-pressure compressed air may be used for this purpose. Hence, as illustrated in FIG. 4, the actuator gas supply is connected directly to three-way solenoid valves S3 and actuator 115 of dispenser 100, without passing through dessicator D, regulator R, or flowmeter F. The actuator gas may be in the range of substantially 30-50 psi, as needed to actuate the components of the present invention.

The actuator gas is used to activate these components, as it reduces the risk of electrocution, both to workers in the facility, and to the fish. Having fish feeding devices with electrical components, hanging over fish tanks or ponds—or in near proximity thereof—creates a risk that power leads may come in contact with water, electrocuting and injuring or killing the fish, or a worker in the hatchery or fish farm. Thus, the present invention utilizes compressed actuator gas such as compressed dried air, to reduce this hazard. In addition, electrical components may be more susceptible to corrosion and shorting, and thus may be less reliable in a marine or aqueous environment.

As illustrated in FIG. 4, the timing of the entire device (feeding timing and frequency, correct stepping of the dispensing unit, and distribution, via manifold and terminal valve sequencing) may be controlled via a laptop computer 450 (e.g., Macintosh or the like) running Indigo™ home automation software available from Perceptive Automation of Allen, Tex. One or more control modules 460 may be coupled to laptop computer 450 to convert signals from laptop computer 450 into electrical control signals to actuate solenoid valves S and S3 (430, 440). Such control modules may comprise a Z-Wave, INSTEON, or X10 control module, as is known in the art, for use with Indigo software.

Conceivably, any precision timing program may operate the unit. A user may already possess specific feeding program software, which may be modified to operate the apparatus of the present invention. Such timing devices and automation software are known in the art and are not described in detail herein.

When the timing program determines that it is time to feed a particular tank of fish, the timing software activates three-way solenoid valves S3 430,435 to supply and vent gas to actuator 115 of dispenser 100. Both three-way solenoid valves S3 430,435 are activated to rotate the actuator. Solenoid valve 430 goes from normally closed (vent), to open, while solenoid valve 435 goes from normally open, to closed (vent). Both solenoids 430, 435 are used to operate the actuator; one to drive it one direction; one to drive it back. In each direction, one of solenoid valves 430, 435 is not driving, it is venting. Actuator 115 then rotates rotating component 170 into the load position as illustrated in FIG. 2, and feed drops into chamber 150. Vibrator 210 may turn on and off while the chamber 150 is in the load position. Solenoids S3 430 435 are then reversed, and actuator 115 rotates rotating component 170 into discharge position as illustrated in FIG. 3. Solenoid S is then actuated, passing dried, lower-pressure carrier gas through dispenser 100 via carrier gas port 220 and out through exit port 200, blowing the dispensed feed with it.

At the same time (or a similar time) when solenoid S is activated, one or more (in the preferred embodiment, one) of three-way solenoid valve S3 440 is activated, to vent compressed actuator gas in order to open one of the terminal valves RV. All unused terminal valves are in the pressurized state, and the three-way valve S3 allows the line to vent when activated. As only one of the terminal valves RV is open at any given time, the feed being blown through dispensing unit 100 passes through the corresponding tubing 420 from manifold 410, and onto the surface of the water of the fish tank or pond. As dry compressed air (or other gases) are being used to as carrier gas to disperse the microparticulate feed, the feed does not cake or clog, and moreover is less likely to oxidize or spoil.

Rather than use a switching manifold to deliver feed (as in the Arvotec device described in the Background of the Invention), the present invention controls the path the microparticulate feed takes by pneumatically opening a corresponding terminal valve, RV. Since the carrier gas follows the path to the open valve, the microparticulate feed is transferred to the correct tank. This approach has a number of advantages over the Prior Art. A switching manifold mechanism would tend to clog and cake with fish feed after a time, which would then require frequent cleaning in order to work properly. In contrast, in the present invention, a contiguous manifold is used, with no switching or directing mechanism, and thus no mechanism to clog. Since a dry compressed carrier gas is used in the manifold 410 and tubing 420, the microparticulate feed will not cake or clog, but instead be transmitted to the desired tank. Even if some small amount of feed particles remain in the manifold 410 or tubing 420, the dry, sealed, compressed gas environment prevents the feed from clogging or caking. In contrast, the Arvotec system, using open-ended tubes and a blower (sending undried atmospheric air) would require periodic cleanings to prevent clogging, as mentioned in their literature. The use of a four-way switching manifold in that design adds unnecessary complexity and cost to the design.

In the present invention, control of quantity and timing of feeding can be readily programmed, using control software as previously described. Using different rotating component elements 170, which provide different chamber sizes 150, may control the quantity of feed dispensed. However, it may be easier, if additional feed quantities are required, to instead provide multiple feedings using a single chamber size 150. Thus, for example, in the preferred embodiment, a 15 mg chamber 150 is provided, which is suitable for test feeding smaller tanks. If it is desired to provide 30, 45, or 60 mg of feed, the device may be simply actuated two, three, or four times (or more) in sequence, to provide the quantity of feed required.

Similarly, the timing of feeding may be altered and programmed at will, to provide feedings at different times during the day, once a day, or whatever requirements are needed for a particular fish or larva feeding program. A number of different tanks may be fed using one dispenser 100, by using a plurality of terminal valves RV, one for each tank. For larger tanks, multiple valves RV may be used, which may be activated individually, or in concert, if desired. The device may also be used to feed a single tank. While illustrated in FIG. 4 as feeding four tanks, other numbers of terminal valves RV and associated solenoids S3 440 may be used without departing from the spirit and scope of the present invention.

By timing the operation of the vibrator, the terminal valve, the pneumatic actuator, and the carrier gas, the feeder is loaded, locked, discharged and the feed is conveyed to the water's surface in the fish tank. When not in use, the feed in the hopper is sealed and protected from moisture and ambient oxygen. An option is available to introduce dry nitrogen as a purge gas to the tubing, chamber and hopper at the end of each cycle to ensure a dry and inert atmosphere, if desired.

What distinguishes the feeder of the present invention from others is the ability to overcome the environmental challenges that lead to inconstant rationing and reduced feed quality associated with other feeders. By separating the dosing dispenser from the terminal delivery, the feed can be protected from the humid environment above the fish tank. The sealed rotating chamber further protects the feed in the hopper from moisture and oxygen between feedings. In addition to conveying the feed, the carrier gas dries both the feed and the tubing and terminal valve during feeding. Thus the system avoids accumulation of feed on surfaces exposed to the atmosphere.

The small (ca. 15 mg) precisely sized portion dispensed by the feeder of the present invention affords a greater control of the feeding schedule so that fish can be fed evenly over time or, for growth trials, to a precise ration. In recent tests, the feeder of the present invention was used to compare repeated accumulations of feed from ten cycles of the rotating chamber. The feed was trapped by a mineral oil bath in a tared beaker. After five repetitions, the standard deviation is generally 3% of the mean accumulated weight. In tests of the manifold system, an average standard deviation of 5% of the mean was achieved after 200 rations delivered to each of two terminal valves, ten cycles each at 15 min. intervals, over five hours. The test feedings were initially spread out over five hours to relieve the duty cycle of the controlling solenoids, ensuring that they did not overheat. Subsequent testing has shown this to be unnecessary, and tests are now conducted at five-minute intervals.

Although described above in terms of the preferred embodiment at the time of filing of the present application, the present invention may also be modified to improve durability and precision. Such modifications, within the spirit and scope of the present invention include:

The incorporation of captive ball bearings and cup seals on the rotating component, to ensure long term performance over a heavy duty cycle.

Improvements to the design of the manifold system to improve the precision between repeated feedings and between feedings dispensed from individual terminal valves.

An optional dry nitrogen injection between feedings, to ensure a dry, inert atmosphere within the tubing, and the dispensing unit.

There are also a number of potential applications for the apparatus of the present invention. The primary embodiment of the feeder is as a laboratory tool where small batches of fish are reared for experimental purposes. The feeder may also be used in small production hatcheries, such as exotic fishes for the aquarium trade. A scaled-up version for delivery of larger volumes of feed may be used by most commercial aquaculture facilities. While disclosed in the context of microparticulate feeds, the present invention may be adapted for other types of feeds (small pellitized feeds and the like) by suitably modifying piping sizes and the like. In addition, the feeder of the present invention may also be used to feed other types of animals or to distribute other types of particulates.

Figure 5:
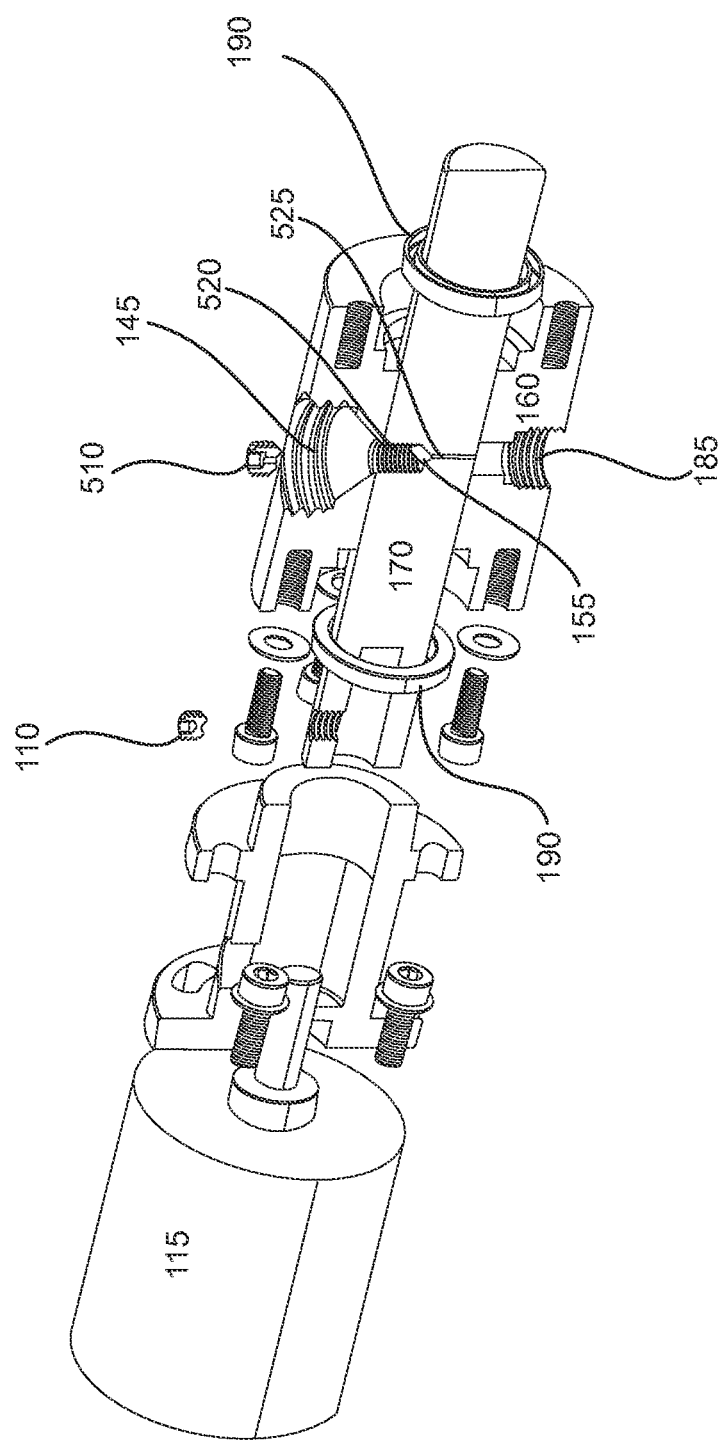
FIG. 5 is perspective cross-section of adjustable dosage dispenser of a second embodiment of the present invention in the load position.
Figure 6:
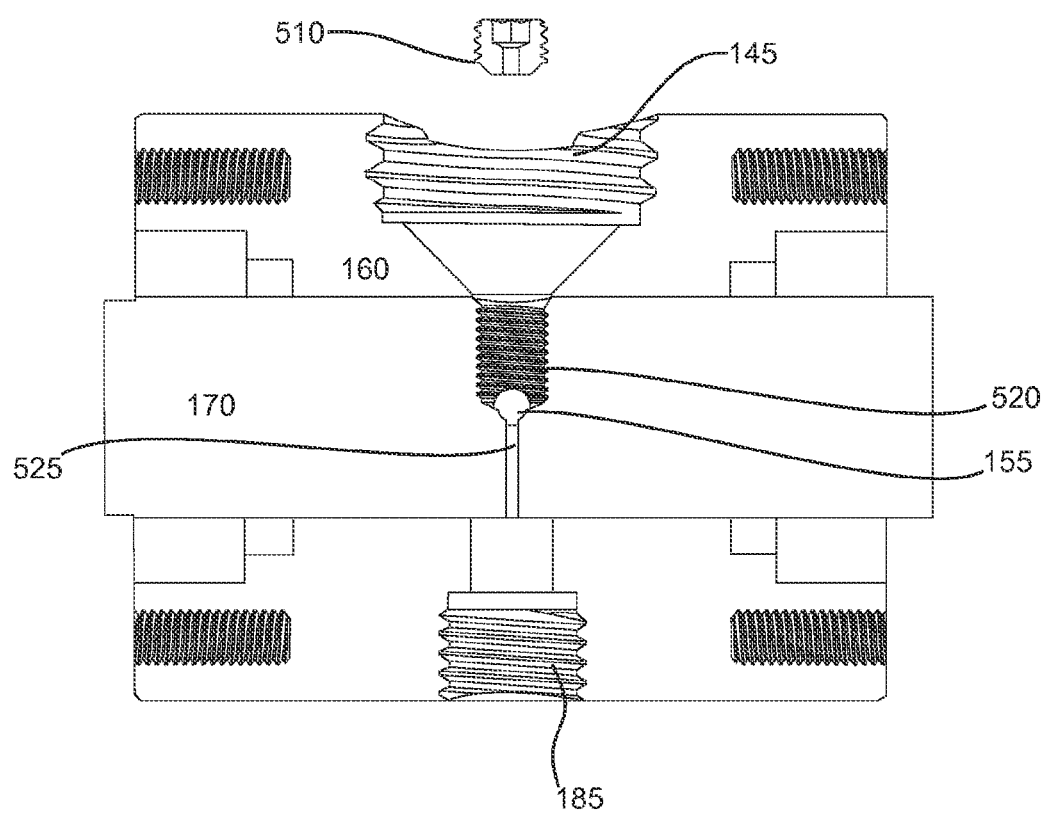
FIG. 6 is side exploded view and cross-section of adjustable dosage dispenser of a second embodiment of the present invention in the load position.

FIG. 5 is perspective cross-section of adjustable dosage dispenser of a second embodiment of the present invention in the load position. FIG. 6 is side exploded view and cross-section of adjustable dosage dispenser of a second embodiment of the present invention in the load position. Like reference numerals for similar components of the embodiment of FIGS. 1-3 refer to like components in the embodiment of FIGS. 5-8.

Referring to FIGS. 5 and 6, in order to adjust the portion dispensed by the feeder an adjustable portion control is provided. In this embodiment, instead of a fixed sized ration chamber 150 and L-shaped passage of FIGS. 1-3 (formed by drilling into the rotating rotating component 170), a ¼"×28 tpi (or other appropriately sized) threaded recess 520 is provided in rotating component 170, forming a T-shaped passage. This recess may be located beneath threaded portion 145, which accepts sealed hopper 140.

The T-shaped passage may comprise three portions. Threaded recess 520 as previously mentioned, exit port 155, through which the microparticulate feed is ejected, and vent passage 525, which allows gasses to be blown through the small opening in set screw 510 to purge the feed hopper. The hole in the set screw 510 also allows the carrier gas to blow out the feed through the exit port in the surrounding housing. The small passage (that completes the "T") 525 in the rotating part is the vent into the feed hopper. The carrier gas passageway 155, which in FIG. 6, for example, extends outward from the page is part of the original "L" shaped configuration.

Within recess 520 is provided a mating nylon set screw 510 with an Allen hex head (or other type, e.g., star bit) socket. Set screw 510 has a small hole through set screw 510 to allow the carrier (conveyance) gas to purge the feed hopper chamber at each dosing. The hole in the set screw also acts a vent to allow the neutral carrier gas via passage 525 to keep the feed in the hopper dry and loose. It is small enough to keep feed particles from falling through, so the depth of the set screw determines the available volume for the dose to occupy.

FIG. 7 is side view cross-section of adjustable dosage dispenser of a second embodiment of the present invention in the load position, showing the feeder dosage adjustment screw 510 in a first position, to maximize dosage. FIG. 8 is side view cross-section of adjustable dosage dispenser of a second embodiment of the present invention in the load position, showing the feeder dosage adjustment screw 510 in a second position, to minimize dosage. In use, in the load position illustrated in FIGS. 5-8, feed passes from the hopper 140 in to the threaded portion 520 not occupied by set screw 510. Rotating component 170 then rotates to a second position, as in the embodiment of FIGS. 1-3, and the carrier gas may then blow the dosage through outlet port 200 by way of threaded outlet 185 in valve body 160, as in the embodiment of FIGS. 1-3.

By screwing the set screw 510 in, or out, a user may increase, or decrease the volume of each dose. In operation, a user may adjust two or more feeders to compensate for variation in nutrient density between diets. Prior to this innovation, a user may have to rely upon the relatively small size of each dose to the overall daily ration, and make up for differences with increased or decreased number of iterations. This improvement greatly improves the precision of studies utilizing multiple feeders.

While the preferred embodiment and various alternative embodiments of the invention have been disclosed and described in detail herein, it may be apparent to those skilled in the art that various changes in form and detail may be made therein without departing from the spirit and scope thereof.

We claim:

1. A microparticulate diet fish feeder, comprising:

a dispenser including:

a sealed feed hopper holding the microparticulate fish feed;

a housing having a substantially cylindrical portion, attached to the sealed feed hopper, having an inlet opening for accepting the microparticulate fish feed, a carrier gas port accepting a lower-pressure compressed carrier gas, and an exit port for discharging the microparticulate fish feed;

a rotating component, located within the substantially cylindrical portion of the housing, and rotatable within the cylindrical portion of the housing, the rotating component having an adjustable volume chamber formed on the perimeter of rotating component 170 and an L-shaped passage having one end connected to the chamber, such that when rotating component 170 is in a first position, the chamber is aligned with the inlet opening and the chamber is filled with the microparticulate fish feed, and when rotating component 170 is in a second position, the chamber is aligned with the exit port and another end of the L-shaped passage is aligned with the carrier gas port, such that the lower-pressure compressed gas forces the microparticulate fish feed through the exit port;

a manifold, having one input attached to the exit port, and a plurality of outputs, the manifold contiguous between the one input and the plurality of outputs;

a plurality of output tubes, each having one end connected to a corresponding one of the plurality of outputs of the manifold;

a plurality of terminal valves, each coupled to another end of a corresponding one of the plurality of output tubes, each of the plurality of terminal valves being selectively activated to disperse the microparticulate fish feed when the lower-pressure carrier gas forces the microparticulate fish feed through the exit port; and a controller, coupled to the dispenser and the plurality of terminal valves, controlling the dispenser and the plurality of terminal valves.

2. The microparticulate diet fish feeder of claim 1, further comprising:

a rotary actuator, coupled to the rotating component and coupled to and controlled by the controller, rotating the rotating component between the first position and the second position, in response to control signals from the controller.

3. The microparticulate diet fish feeder of claim 2, wherein the rotary actuator comprises a pneumatic rotary actuator, the microparticulate diet fish feeder further comprising:

a pair of three-way solenoid gas valves, coupled between the controller and the rotary actuator, the pair of first three-way solenoid gas valves coupled to a source of higher pressure actuator gas having a pressure higher than the lower-pressure carrier gas, such that the one of the pair of three-way solenoid gas valves, when activated by a signal from the controller, supplies high pressure gas to the pneumatic rotary actuator to rotate the rotating component to the first position, and when another of the pair of three-way solenoid gas valves is activated by a signal from the controller, the pneumatic rotary actuator rotates to the second position.

4. The microparticulate diet fish feeder of claim 3, wherein the lower-pressure carrier gas comprises a dried gas having a static pressure substantially between 3-5 psi, and a dynamic pressure between 1-2 psi and a flow rate of substantially 5-10 Lpm.

5. The microparticulate diet fish feeder of claim 4, further comprising:

a first solenoid valve, coupled to receive the lower-pressure carrier gas, and coupled to the controller, the first solenoid valve activated in response to a signal from the controller to pass the lower-pressure carrier gas to the carrier gas port on the housing.

6. The microparticulate diet fish feeder of claim 5, further comprising:
a plurality of three-way solenoid valves, each coupled to a corresponding one of the plurality of terminal valves and coupled to and receiving a control signal from the controller, each of the plurality of three-way solenoid valves selectively supplying higher-pressure actuator gas to a corresponding one of the plurality of terminal valves to close the corresponding one of the plurality of terminal valves, and when a corresponding one of the three-way solenoid gas valves is activated by a signal from the controller, the higher pressure actuator gas to the corresponding one of the plurality of terminal valves is vented and the terminal valve is opened.

7. The microparticulate diet fish feeder of claim 6, wherein each of the plurality of terminal valves are located at a corresponding one of a plurality of fish enclosures, wherein the microparticulate fish feed disperses the fish feed into a corresponding one of a plurality of fish enclosures.

8. The microparticulate diet fish feeder of claim 7, wherein the dispenser is located remotely from the plurality of fish enclosures to isolate the dispenser from moisture from the plurality of fish enclosures.

9. The microparticulate diet fish feeder of claim 8, further comprising a vibrator, coupled to the sealed feed hopper and activated by the controller, configured to vibrate the sealed feed hopper to insure the microparticulate fish feed passes into the chamber in the rotating component.

10. The microparticulate diet fish feeder of claim 9, further comprising an LED coupled to the sealed feed hopper and the vibrator, the LED configured to illuminate when the vibrator is activated.

11. The microparticulate diet fish feeder of claim 10, further comprising a vent valve, attached to the sealed feed hopper, configured to vent any excess pressure from carrier gas blowing into the hopper when the rotating component is rotated into the first position, thus venting the previously pressurized manifold, the gas passing upwards through the microparticulate fish feed, keeping it loose and desiccated.

12. The microparticulate diet fish feeder of claim 1, wherein the adjustable volume chamber comprises:
a threaded portion, formed on the perimeter of the rotating component, coupled to the L-shaped passage;
a threaded member, threaded into the threaded portion, adjustably threaded into the threaded portion to form an adjustable volume chamber above the threaded member, such that when the further the threaded member is threaded into the rotating component, the volume of the adjustable volume chamber is increased;
wherein the threaded member is provided with a through hole sufficient to allow gas to pass through the threaded member while blocking passage of the microparticulate fish feed.

13. An animal feeder, comprising:
a dispenser including:
a sealed feed hopper holding the animal feed;
a housing having a substantially cylindrical portion, attached to the sealed feed hopper, having an inlet opening for accepting the animal feed, a carrier gas port accepting a lower-pressure compressed carrier gas, and an exit port for discharging the animal feed;
a rotating component, located within the substantially cylindrical portion of the housing, and rotatable within the cylindrical portion of the housing, the rotating component having an adjustable volume chamber formed on the perimeter of the rotating component and an L-shaped passage having one end connected to the chamber, such that when the rotating component is in a first position, the chamber is aligned with the inlet opening and the chamber is filled with the animal feed, and when the rotating component is in a second position, the chamber is aligned with the exit port and another end of the L-shaped passage is aligned with the carrier gas port, such that the lower-pressure carrier gas forces the animal feed through the exit port;
a manifold, having one input attached to the exit port, and a plurality of outputs, the manifold contiguous between the one input and the plurality of outputs;
a plurality of output tubes, each having one end connected to a corresponding one of the plurality of outputs of the manifold;
a plurality of terminal valves, each coupled to another end of a corresponding one of the plurality of output tubes, each of the plurality of terminal valves being selectively activated to disperse the animal feed when the lower-pressure carrier gas forces the animal feed through the exit port; and
a controller, coupled to the dispenser and the plurality of terminal valves, controlling the dispenser and the plurality of terminal valves.

14. The animal feeder of claim 13, further comprising:
a rotary actuator, coupled to the rotating component and coupled to and controlled by the controller, rotating the rotating component between the first position and the second position, in response to control signals from the controller.

15. The animal feeder of claim 14, wherein the rotary actuator comprises a pneumatic rotary actuator, the animal feeder further comprising:
a pair of three-way solenoid gas valves, coupled between the controller and the rotary actuator, the pair of three-way solenoid gas valve coupled to a source of higher pressure actuator gas, such that one of the pair of three-way solenoid gas valves, when activated by a signal from the controller, supplies higher pressure actuator gas to the pneumatic rotary actuator to rotate the rotating component to the first position, and when another of the pair of three-way solenoid gas valves is activated by a signal from the controller, the pneumatic rotary actuator rotates to the second position.

16. The animal feeder of claim 15, wherein the lower-pressure carrier gas comprises a dried gas having a static pressure substantially between 3-5 psi, and a dynamic pressure between 1-2 psi and a flow rate of substantially 5-10 Lpm.

17. The animal feeder of claim 16, further comprising:
a first solenoid valve, coupled to received the lower-pressure carrier gas, and coupled to the controller, the first solenoid valve activated in response to a signal from the controller to pass the lower-pressure carrier gas to the carrier gas port on the housing.

18. The animal feeder of claim 17, further comprising:
a plurality of three-way solenoid valves, each coupled to a corresponding one of the plurality of terminal valves and coupled to and receiving a control signal from the controller, each of the plurality of three-way solenoid valves selectively supplying higher-pressure actuator gas to a corresponding one of the plurality of terminal valves to close the corresponding one of the plurality of terminal valves, and when a corresponding one of the three-way solenoid gas valves is activated by a signal from the controller, the corresponding one of the plurality of terminal valves is opened.

19. The animal feeder of claim 18, further comprising a vibrator, coupled to the sealed feed hopper and activated by the controller, configured to vibrate the sealed feed hopper to insure the animal feed passes into the chamber in the rotating component.

20. The animal feeder of claim 19, further comprising an LED coupled to the sealed feed hopper and the vibrator, the LED configured to illuminate when the vibrator is activated.

21. The animal feeder of claim 20, further comprising a vent valve, attached to the sealed feed hopper, configured to vent any excess pressure from carrier gas blowing into the hopper when the rotating component is rotated into the first position, thus venting the previously pressurized manifold, the gas passing upwards through the animal feed, keeping it loose and desiccated.

22. The animal feeder of claim 13, wherein the adjustable volume chamber comprises:
   a threaded portion, formed on the perimeter of the rotating component, coupled to the L-shaped passage;
   a threaded member, threaded into the threaded portion, adjustably threaded into the threaded portion to form an adjustable volume chamber above the threaded member, such that when the further the threaded member is threaded into the rotating component, the volume of the adjustable volume chamber is increased;
   wherein the threaded member is provided with a through hole sufficient to allow gas to pass through the threaded member while blocking passage of the animal feed.

* * * * *